(12) United States Patent
Gouette et al.

(10) Patent No.: US 7,944,372 B2
(45) Date of Patent: May 17, 2011

(54) AIRCRAFT TIP ALARM SYSTEM

(75) Inventors: Geoffrey E. Gouette, Stanwood, WA (US); Steven B. White, Arlington, WA (US); James M. Merrick, Everett, WA (US); Kristine K. Weed, Mill Creek, WA (US); Paul A. VanGinhoven, Arlington, WA (US); Steven L. Wehr, Everett, WA (US); Ralph E. Fossen, Carnation, WA (US); Farid Piroozmandi, Bothell, WA (US); Brian L. Collen, Everett, WA (US); Sudershan K. Taneja, Everett, WA (US)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 12/106,090

(22) Filed: Apr. 18, 2008

(65) Prior Publication Data
US 2009/0261203 A1 Oct. 22, 2009

(51) Int. Cl.
*G08B 23/00* (2006.01)
(52) U.S. Cl. ........................................ 340/960; 340/945
(58) Field of Classification Search .................. 340/945, 340/960, 665, 666, 686.1, 686.3, 686.6; 244/100 R, 244/102 A, 102 R; 701/124; 703/8; 702/101
See application file for complete search history.

(56) References Cited

U.S. PATENT DOCUMENTS

| | | | | |
|---|---|---|---|---|
| 3,584,503 A | * | 6/1971 | Senour | 73/65.06 |
| 3,701,279 A | | 10/1972 | Harris et al. | |
| 4,034,334 A | * | 7/1977 | Allyn | 340/945 |
| 4,312,042 A | * | 1/1982 | Bateman | 701/124 |
| 4,507,742 A | * | 3/1985 | Bateman | 702/101 |
| 6,128,951 A | * | 10/2000 | Nance | 73/178 T |
| 6,499,005 B2 | * | 12/2002 | Gunderson et al. | 703/8 |
| 6,854,689 B1 | * | 2/2005 | Lindahl et al. | 244/102 R |
| 7,093,795 B2 | * | 8/2006 | Lindahl et al. | 244/102 R |
| 7,274,310 B1 | * | 9/2007 | Nance | 340/960 |
| 7,475,849 B2 | * | 1/2009 | Lindahl et al. | 244/102 A |
| 2008/0119967 A1 | | 5/2008 | Long et al. | |
| 2009/0105874 A1 | * | 4/2009 | Tietjen et al. | 700/217 |

FOREIGN PATENT DOCUMENTS
CN 101349606 9/2008
DE 202 06 677 4/2002
* cited by examiner

*Primary Examiner* — Van T. Trieu
(74) *Attorney, Agent, or Firm* — Haynes & Boone, LLP.

(57) ABSTRACT

A tip alarm system for an aircraft having a nose landing gear (NLG) includes a sensor having first and second parts respectively disposed on first and second portions of the NLG that are respectively fixed to the aircraft and moveable relative to the fixed portion and operable to detect the position of the first and second portions relative to each other and to produce a tip alarm signal when the first and second NLG portions are disposed at a selected position relative to each other corresponding to an imminent aircraft tipping condition and thereby prevent the aircraft from tipping back onto the ground due to improper loading of the aircraft.

21 Claims, 6 Drawing Sheets

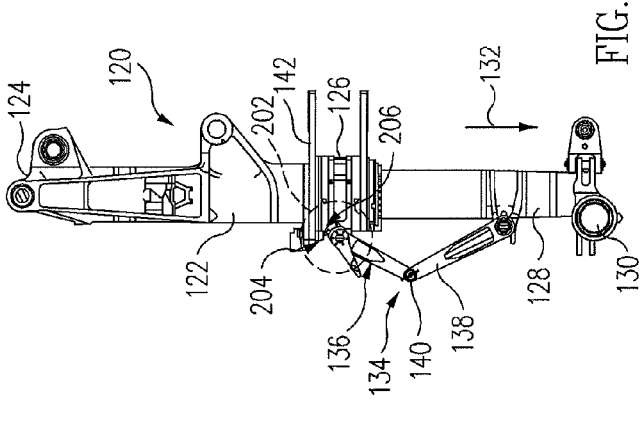
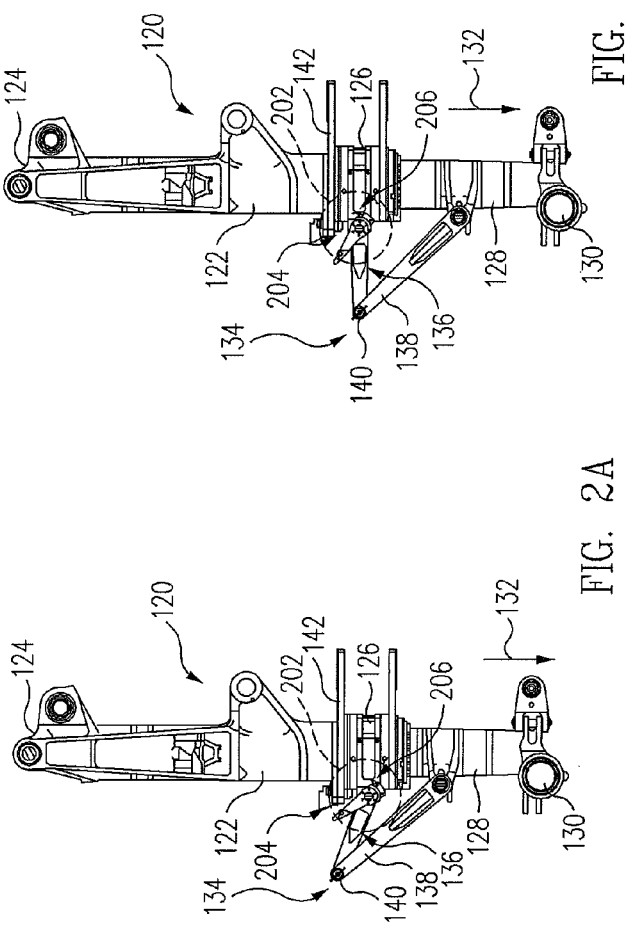
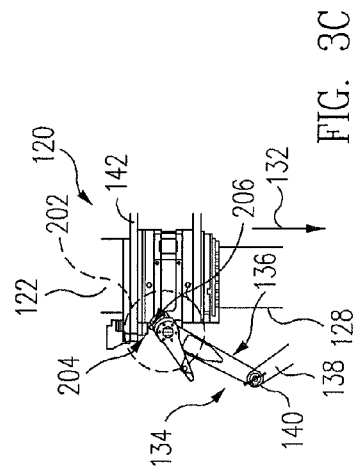
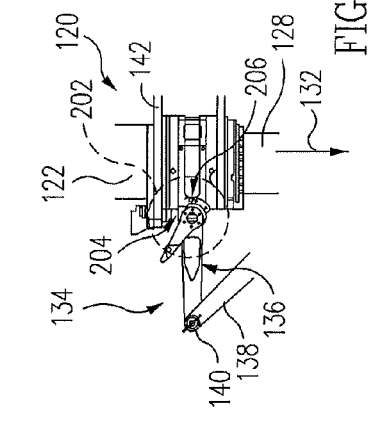
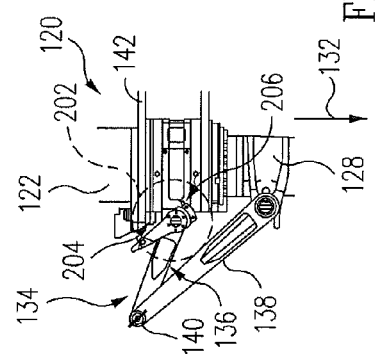

AIRCRAFT TIP ALARM SYSTEM

BACKGROUND

This disclosure generally relates to sensor systems for aircraft, and more particularly, to a tip-back alarm system for an aircraft that detects when the aircraft has been loaded or unloaded in such a way that it is in danger of tipping back on its tail unless preventative action is taken.

An aircraft's initial, i.e., pre-flight, "weight and balance" determination is typically made while the aircraft is parked on the ground, and systems have been developed that are carried onboard the aircraft and that are capable of determining an aircraft's weight and balance automatically, in real time and continuously while it is being loaded. One such system is described in commonly owned U.S. patent application Ser. No. 11/560,451, filed Nov. 16, 2006, by M. Long et al.

Some onboard weight and balance measuring systems, such as that referenced above, may also include a "tip alarm" feature that measures nose gear loads, calculates the position of the aircraft's center of gravity (CG) and warns the personnel responsible for the loading of the aircraft if and when an aircraft tipping condition is imminent, so that appropriate corrective action can be taken to prevent the aircraft from tipping back.

Modern large aircraft, such as passenger and cargo jets, are typically provided with a tricycle landing gear, i.e., a nose gear disposed at the front of the aircraft and two or more main gears that are disposed aft of the aircraft's center of gravity and bilaterally symmetrical to its roll axis. Thus, an important consideration related to an aircraft's weight and balance, particularly for large aircraft capable of carrying heavy cargo and/or passenger loads, is that it not be loaded or unloaded in such a way that the change in loading causes the aircraft to "tip," or tilt backward, i.e., rotate rearward about its main gear, such that the tail of the aircraft comes into contact with the ground and damages the aircraft.

However, since the primary function of such systems is to determine aircraft weight and balance, the existing systems that are also capable of providing a tip alarm feature are more complex, expensive, prone to in-service reliability problems if not scrupulously maintained, and are more difficult to calibrate than is necessary to implement a simple aircraft tip alarm function.

Accordingly, a need exists in the aviation industry for a tip alarm system for an aircraft that is inexpensive, light in weight, simple to install, use and service, yet which is also very reliable.

SUMMARY

In accordance with the present disclosure, an airplane tip alarm system is provided that is reliable and less expensive, lighter in weight, and simpler to install, use and service than the tip alarm systems of the prior art.

The novel tip alarm system detects an extension of the nose landing gear beyond a preset "tipping threshold" during cargo loading and unloading operations and sends an alarm signal to ground personnel responsible for the loading of the aircraft, and if appropriate, to an automated cargo handling system, that prevents further movement of cargo into and/or rearward in the aircraft when the aircraft begins to approach the threshold of a tip back condition. The system is able to effect a reliable tip warning with the addition of only a single position sensor mounted on the nose landing gear (NLG) of the aircraft. The tip sensor, which may comprise a "sensing" part and an associated "target" part, may be mounted on portions of the shock strut of the NLG, and determines when the extension of the NLG shock strut reaches the tipping threshold, based on the relative positions of the two parts of the sensor, which may be respectively mounted on the fixed and moveable portions of the shock strut of the NLG, and activates a tip alarm. The tip alarm sensor may be powered only during ground handling, thereby preventing any nuisance messages or false alarms during airplane taxi, flight or landing operations.

In one possible exemplary embodiment, a tip alarm system for an aircraft having a nose landing gear (NLG) comprises a sensor having first and second parts respectively disposed on portions of the NLG that are respectively fixed to the aircraft and moveable relative to the fixed portion, the sensor being operable to detect the position of the first and second sensor parts relative to each other, and a controller operable to generate a tip alarm signal when the first and second sensor parts are disposed at a selected relative position corresponding to the shock strut stroke position of an imminent tipping condition of the aircraft.

In another exemplary embodiment, an aircraft tip alarm system comprises a sensor disposed on a nose landing gear (NLG) of the aircraft and operable to detect the weight imposed by the aircraft on the NLG as a function of the length of the NLG between the aircraft and the ground, and an apparatus for generating a tip alarm when the weight imposed by the aircraft on the NLG falls below a selected threshold amount corresponding to an imminent tipping condition of the aircraft.

In yet another exemplary embodiment, a method for preventing the tipping back of an aircraft while it is being loaded or unloaded comprises: Respectively disposing first and second parts of a sensor on first and second portions of a nose landing gear (NLG) of the aircraft, the first portion being fixed to the aircraft and the second portion being moveable relative to the fixed portion, the sensor being operable to detect the position of the first and second portions relative to each other; monitoring the position of the first and second portions of the NLG relative to each other with the sensor during the loading or unloading of the aircraft; detecting that the first and second portions of the NLG are disposed at a selected relative position corresponding to an imminent aircraft tipping condition; and, generating a tip alarm signal when the first and second portions of the NLG are disposed at the selected relative position.

The simple, relatively inexpensive, yet reliable alarm system of the present disclosure can prevent an aircraft being loaded on the ground from tipping back onto its tail and being damaged thereby due to improper loading of the aircraft.

A better understanding of the above and many other features and advantages of the novel tip alarm system of the present disclosure may be obtained from a consideration of the detailed description of some exemplary embodiments thereof below, particular if such consideration is made in conjunction with the appended drawings, wherein like reference numbers are used to refer to like elements in the respective figures thereof.

BRIEF DESCRIPTION OF THE DRAWINGS

FIGS. 2A-2C are partial elevation views of the nose gear shock strut of an aircraft equipped with a sensor of an exemplary embodiment of an aircraft tip alarm system in accordance with the present disclosure, respectively showing the shock strut in a fully compressed state, a moderately extended state, and a substantially extended state corresponding to a tipping threshold of the aircraft;

FIGS. 3A-3C are enlarged partial elevation views of the nose gear shock strut of FIGS. 2A-2C, showing a first sensor mounting location for detecting the rotational movement of upper and lower arms of a torsion link of the shock strut with extensional movement of a lower portion of the strut relative to an upper portion thereof;

DETAILED DESCRIPTION

Figure 1:
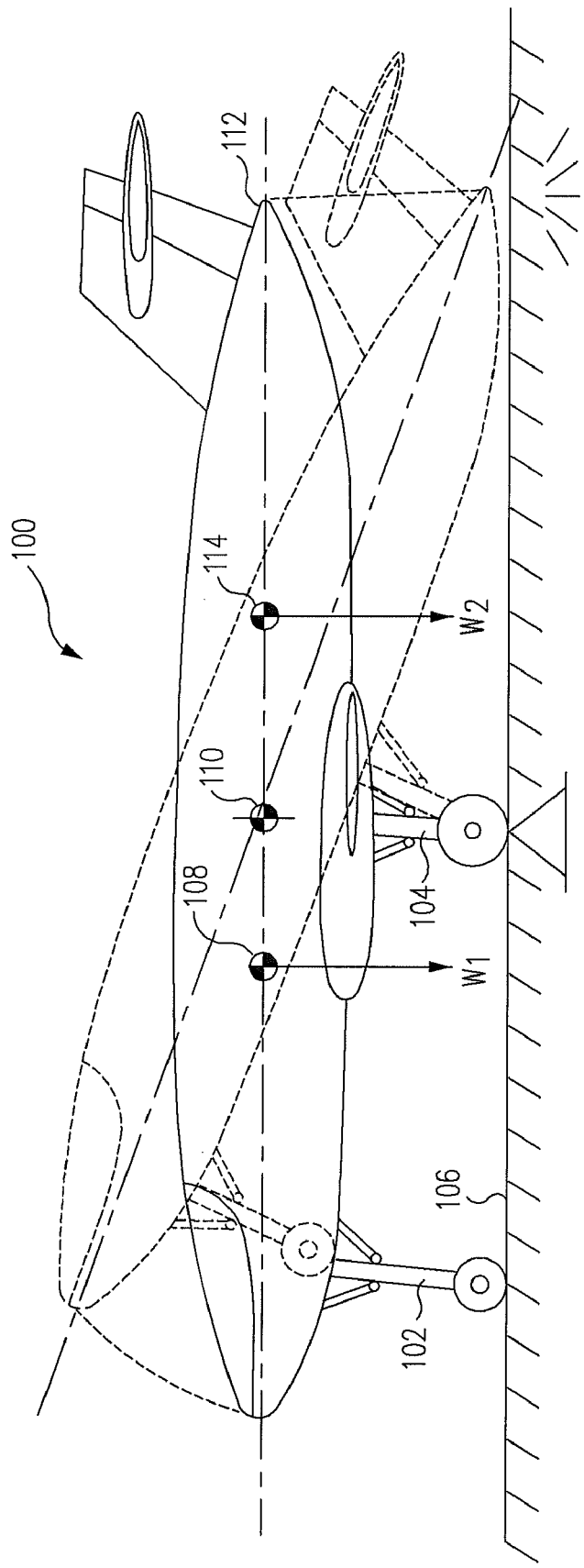
FIG. 1 is a left side elevation view of an aircraft equipped with a tricycle landing gear, shown disposed on the ground before and after a tipping incident.

FIG. 1 is a left side elevation view of an aircraft 100 equipped with a tricycle landing gear, comprising a nose landing gear (NLG) 102 and a pair of bilaterally symmetrical main landing gears (MLG) 104 disposed aft of the NLG, in which the aircraft is shown parked on the ground 106 before (solid outline) and after (dashed outline) an undesirable tipping incident of the type discussed above. When unloaded, the aircraft 100 has an empty weight W1 that acts through a center of gravity (CG) that is, by design, located at a position 108 forward of the MLG 104 and aft of the NLG 102. Generally, so long as the CG of the aircraft remains within a horizontal support triangle defined by the points at which the three landing gears contact the ground 106, the aircraft will repose stably and upright on the ground. Consideration of the lateral movement of the CG is generally not required when the main landing gears 104 are placed far enough outboard of the aircraft 100 centerline to ensure the aircraft is stable during ground handling maneuvers, such as turning.

However, when loading of the aircraft 100 begins, the total weight W of the aircraft begins to increase correspondingly, and the position of the CG also shifts in the direction of the longitudinal position within the aircraft at which the additional load is placed. Loading of the aircraft can cause the CG to shift forward or rearward in the aircraft relative to the initial, unloaded position 108. As the CG approaches a "tipping point" 110, generally located at the rear boundary of the support triangle described above, the attitude of the aircraft becomes unstable, and as illustrated by the dashed outline in FIG. 1, if additional weight is then added to or removed from the aircraft, or if the weight is moved sufficiently rearward in the aircraft, the shift of the CG may cause the aircraft to rotate, or tip rearward, about its main gear 104 such that the tail 112 of the aircraft strikes the ground and causes damage to the aircraft and potential injury to personnel.

Indeed, as illustrated in FIG. 1, it is possible to load or unload an aircraft 100 with a resultant aircraft weight W2 that is substantially less than the maximum weight that the aircraft is capable of carrying, but which results in a CG location 114 that is so far aft relative to the horizontal landing gear support triangle that the aircraft may nevertheless tip backward. Since this undesirable and dangerous tipping condition can result from either an improper loading or unloading of the aircraft, the term "loading," as used herein, is defined to include the "unloading" of the aircraft.

Other, external factors can also affect the tipping threshold of the aircraft 100 during loading, such as the ambient temperature, whether the aircraft is facing into a headwind or a tailwind, the servicing levels and friction within the shock struts of the landing gears, and whether the aircraft is parked on an upslope or a down slope during loading. Cargo movement after the tip alarm has detected a tipping condition and after the cargo handling system has been deactivated is also a factor, since instantaneous stoppage of the cargo is not practical. As will be appreciated, it is desirable that any alarm system designed to address the tip back problem be designed either to compensate for or be independent of such external factors.

As may be appreciated from the foregoing, the technique by which the aircraft 100 is loaded and unloaded with cargo, as well as a number of external factors, can have a significant effect on the location of the aircraft's CG and the location of its tipping threshold. When the CG of the airplane moves aft towards the main landing gear 104, the main gears 104 become more loaded and the nose landing gear 102 becomes less loaded and, as above, if the CG shifts too far aft, the airplane may tip back on its tail 112. As illustrated in FIGS. 2A-2C, unloading of the NLG 102 causes a shock strut 120 of the NLG to extend until a full or maximum extension is achieved. This shock strut extension causes the nose of the aircraft to move upward. Thus, by establishing and detecting a maximum allowable stroke limit of the shock strut 120 of the NLG 102 while the loading of the aircraft 100 is such that the aircraft is still stable, a tip alarm system 200 of the type described below can be implemented, which can be used to prevent further loading of cargo into the aircraft, 100, or unloading of cargo out of the aircraft 100, or movement of cargo within the aircraft 100, and hence, the occurrence of an undesirable tipping incident.

The stroke of the shock strut 120 of the NLG 102 corresponding to the alarm threshold can be detected by a simple sensor 202 arrangement such as described in more detail below, and with proper adjustment, activation of the tip alarm system 200 can be set to the shock strut stroke position corresponding to any aircraft imminent tipping limit and corresponding margin of safety desired. The external factors discussed above and the desired margin of safety must be considered in determining the shock strut stroke position corresponding to the alarm threshold.

FIGS. 2A-2C are partial elevation views of a shock strut 120 of a NLG 102 of an aircraft equipped with an exemplary embodiment of an aircraft tip alarm system 200 in accordance with the present disclosure, respectively showing the shock strut in a fully compressed state, a moderately extended state, and a substantially extended state corresponding to an imminent tipping threshold of the aircraft. FIGS. 3A-3C are enlarged partial elevation views of the NLG shock strut 120 of FIGS. 2A-2C, showing the relative rotational movement of the upper and lower links 136 and 138 of a torsion linkage 134 of the shock strut in response to extensional movement of a lower portion 128 of the strut relative to an upper portion 122 thereof.

As illustrated in FIGS. 2A-2C, the NLG shock strut 120 may comprise an upper portion 122 having a upper end 124 pivotably fixed to the aircraft and an opposite lower end 126, and an elongated lower portion 128 having a lower end 130 disposed in indirect contact with the ground, for example, through a wheel and tire (not illustrated) and an opposite upper end (not visible in the figures) that moves telescopically within the upper portion 122 of the strut in response to a change in the weight imposed by the aircraft on the NLG, as indicated by the arrows 132 in the figures.

The shock strut 120 may also include a torsion linkage 134 having upper and lower torsion links 136 and 138, each having a first end respectively coupled to the upper and lower portions 122 and 128 of the shock strut for pivotal movement and opposite second ends rotationally coupled to each other to form a knuckle joint 140. As illustrated in the enlarged views of FIGS. 3A-3C, extensional or downward movement of the lower shock strut portion 128 relative to the upper shock strut portion 122 resulting from a reduction in the weight of the aircraft acting on the shock strut causes the first end of the upper link arm 136 to rotate counterclockwise through an angle that is proportional to the amount that the lower shock strut portion 128 moves down relative to the upper, or fixed, portion 122.

Thus, as discussed above, if a sensor 202 (indicated by the dashed circle) of the tip alarm system 200, comprising two complementary parts 204 and 206, which in one embodiment, may comprise a "sensor" part and a "target" part, that are respectively mounted on the upper portion 122 of the shock strut 120, e.g., on a steering actuator support plate 142 thereof, and on the first end of the upper link arm 136, the angular positions of the first and second sensor parts 204 and 206 relative to each other can be sensed or detected and used as an indicator of the amount of extension of the lower strut portion 128 relative to the upper portion 122 thereof which corresponds to the tipping alarm threshold.

Figure 4A:
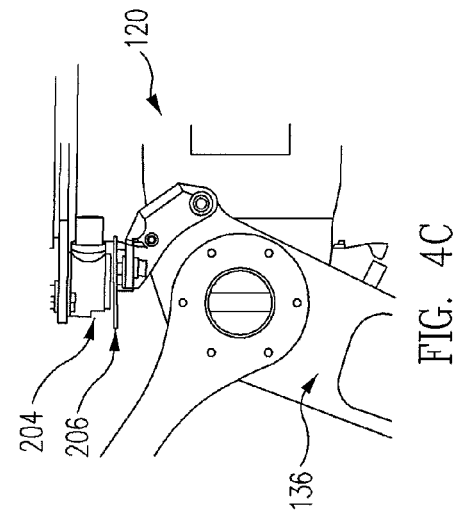
FIGS. 4A-4C are enlarged partial elevation views of the nose gear shock strut of FIGS. 3A-3C, showing a sensor mounting location for detecting the rotational movement of the upper arm of the torsion link of the shock strut with extensional movement of the lower portion of the strut relative to an upper portion thereof.
Figure 4B:
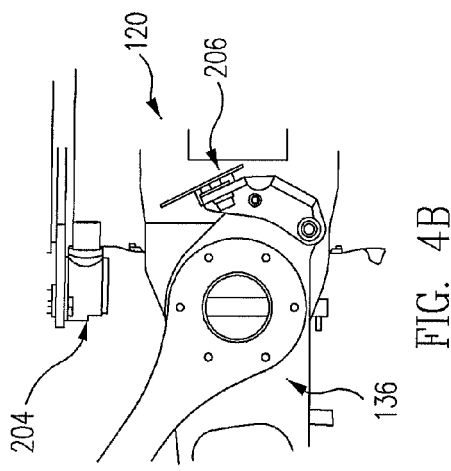
Figure 4C:
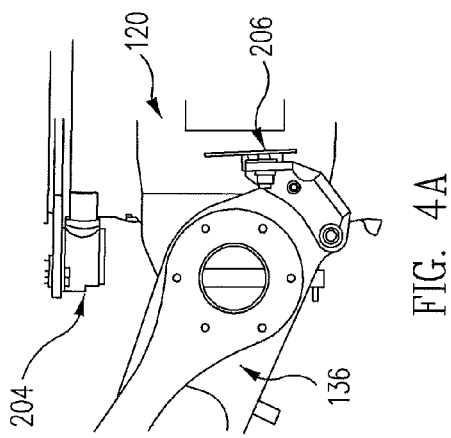
Figure 5A:
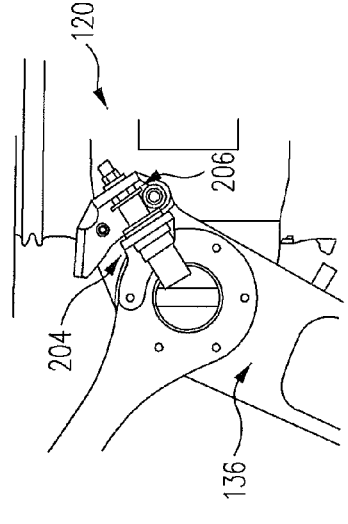
FIGS. 5A-5C are enlarged partial elevation views of the nose gear shock struts of FIGS. 3A-3C, showing a second sensor mounting location, wherein a first part of the sensor is mounted to an upper torsion link pin fixed to the steering collar on the fixed portion of the shock strut and the second part of the sensor is positioned on the rotational upper torsion link arm pinned to a steering collar.
Figure 5B:
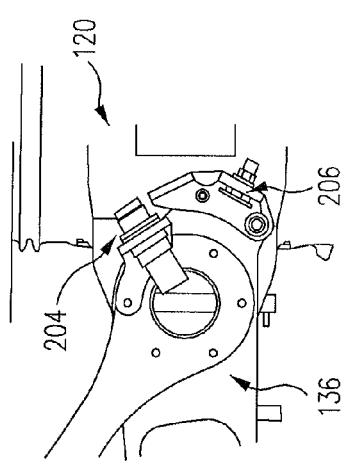
Figure 5C:
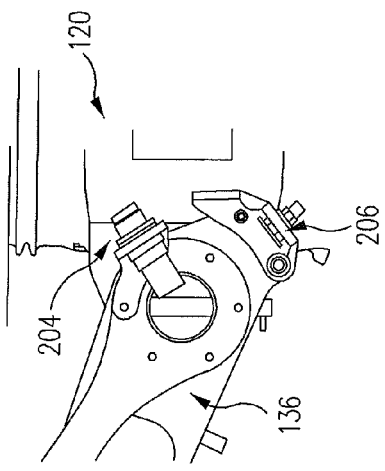

FIGS. 4A-4C are enlarged partial elevation views of the nose gear shock strut 120 of FIGS. 3A-3C, showing a possible mounting location for the sensor parts 204 and 206 for detecting the rotational movement of the upper arm 136 of the torsion link 134 of the shock strut with extensional movement of the lower portion 128 of the strut relative to the upper portion 122 thereof;

FIGS. 5A-5C are enlarged partial elevation views of the nose gear shock struts of FIGS. 3A-3C, showing a second possible mounting location for the sensor parts 204 and 206, wherein the first part 204 of the sensor 202 is mounted to an upper torsion link pin fixed to the steering collar on a fixed portion of the shock strut 120 and the second part 206 of the sensor is positioned on a rotational upper torsion link arm pinned to a steering collar.

As described above, in the particular exemplary embodiments illustrated in FIGS. 2A-2C, 3A-3C, 4A-4C, and 5A-5C, the first and second parts 204 and 206 of the sensor 202 are disposed to move rotationally relative to each other in response to extensional movement of the lower portion 128 of the NLG shock strut 120 relative to the upper portion 122 thereof. However, it should be understood that the tip alarm system 200 of the present disclosure is not limited to such an arrangement, and as those of skill in the art will appreciate, in one possible alternative embodiment (not illustrated), the first and second sensor parts 204 and 206 may be disposed to move linearly, as opposed to rotationally, relative to each other in response to the corresponding linear extensional movement of the lower portion 128 of the NLG shock strut 120 relative to the upper portion 122 thereof. In such an embodiment, the sensor 202 may comprise, for example, a so-called linear variable displacement transducer (LVDT), comprising a magnetically permeable rod mounted on one of the shock strut portions 122 or 128 and disposed concentrically within a pair of electromagnetic coils mounted on the other shock strut portion for relative axial movement within the coils and used to sense the position of the two shock strut portions 122 and 128 relative to each other.

Figure 6:
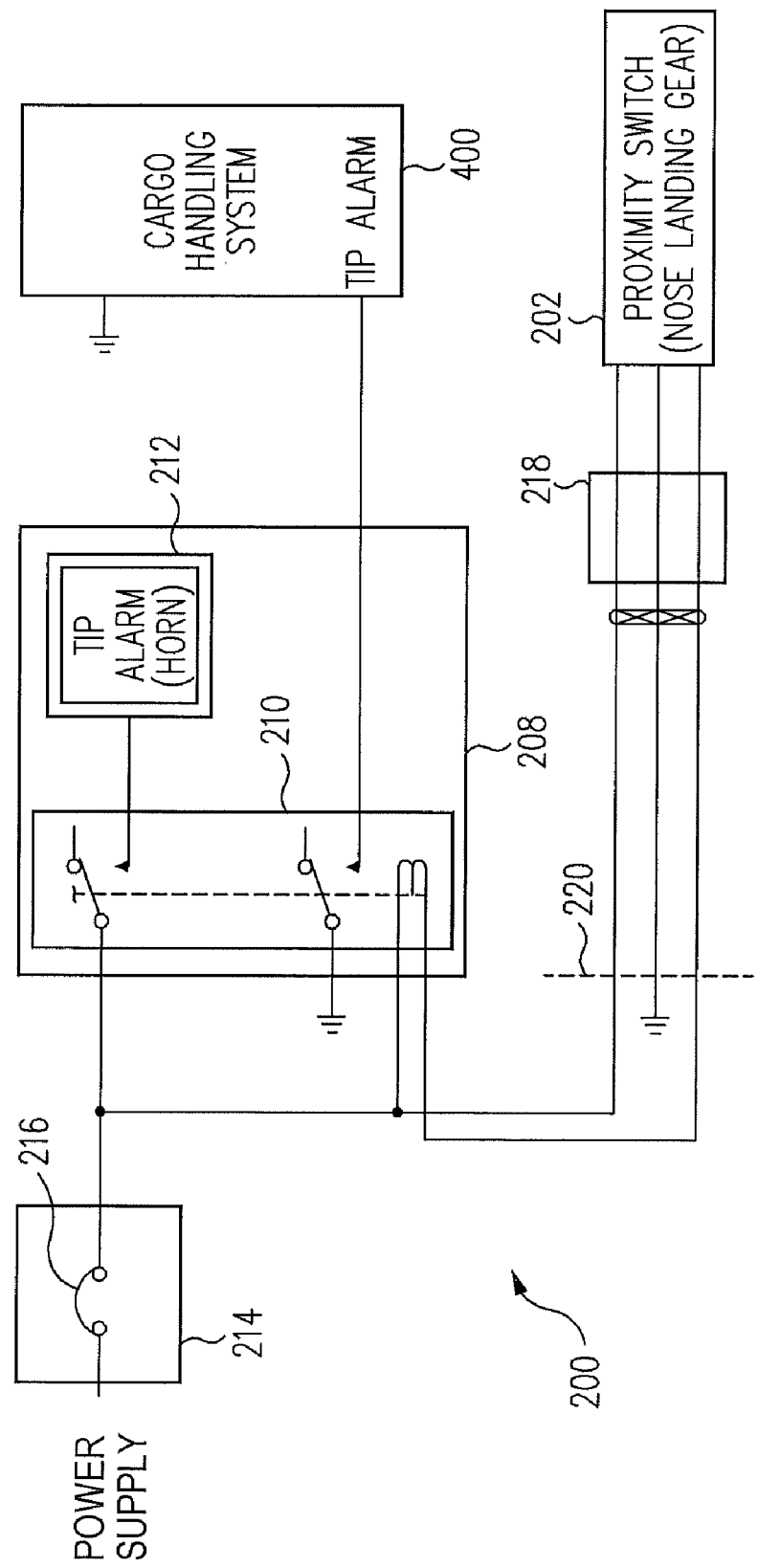
FIG. 6 is an electrical schematic and functional block diagram of the exemplary tip alarm system.

As illustrated in the schematic and functional block diagram of FIG. 6, the aircraft tip alarm system 200 may further include a controller 208, which may comprise a simple electrical relay mechanism 210, that is operable to detect when the two sensor parts 204 and 206, and hence, the upper and lower portions 122 and 128 of the NLG shock strut 120, are disposed at a selected relative shock strut stroke position corresponding to an imminent aircraft tipping condition, and, upon the detection of such a condition during the loading of the aircraft, to generate an alarm signal, which may be electrical in nature, and to activate an alarm mechanism 212, such as a horn and/or a warning light, that produces an alarm sensible to the personnel loading the aircraft, such as the loadmaster, to warn them of the existence of such condition.

Additionally, as illustrated in FIG. 6, if the aircraft is being loaded at least in part by an automatic cargo handling system 400, the alarm controller 208 may be further operable to either fully or partially deactivate the cargo handling system upon the detection of an incipient tipping condition of the aircraft.

As illustrated in FIG. 6, the tip alarm system 200 may further include a ground handling service panel 214 that provides an interface for coupling the system to a power supply on the ground, such as an electrical ground cart (not illustrated), and the service panel 214 may include an overcurrent protection mechanism, such as a fuse or circuit breaker 216. The system may additionally include a NLG electrical service panel 218 that interfaces the sensor 202 to the portions of the tip alarm system 200 in the aircraft through a pressure seal 220 located in, for example, the NLG wheel well, and that provides access to the sensor by ground service personnel.

Figure 7:
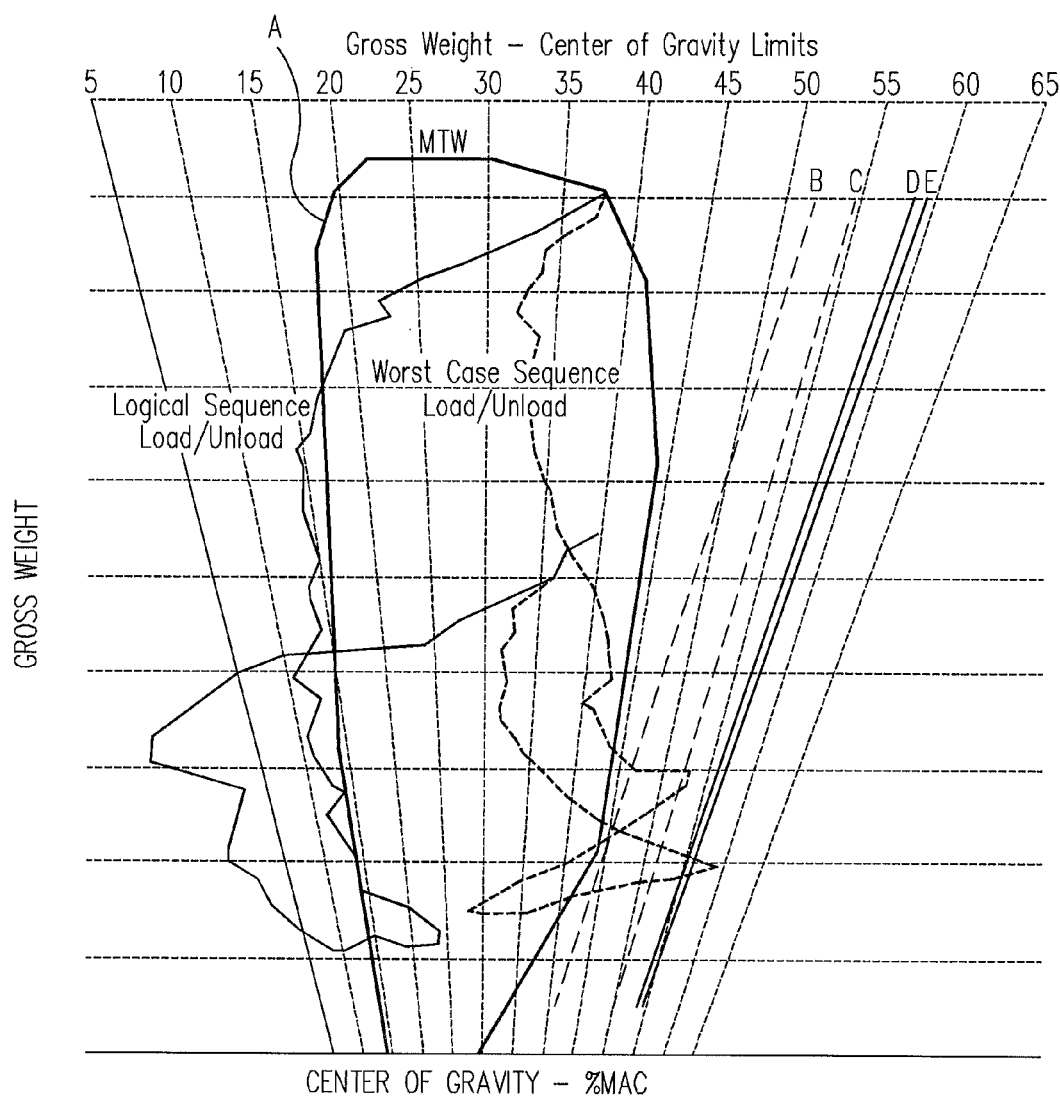
FIG. 7 is a chart of the boundary of the allowable gross weight of an aircraft as a function of the location of its center of gravity (CG) relative to its mean aerodynamic chord (MAC), in which two possible cases of tipping limits as a function of external conditions and the alarm thresholds corresponding thereto are shown; and, FIG. 8 is a block diagram of an exemplary method for using the tip alarm system of the present disclosure.

FIG. 7 is a chart of a type that may be used by loading personnel, such as a loadmaster, in the loading of an exemplary aircraft, in which the boundary A of the maximum allowable gross weight of the aircraft is plotted as a function of the location of its resulting center of gravity (CG) relative to the mean aerodynamic chord (MAC) of its wings, expressed as a percentage of the distance of the CG from the leading edge of the MAC with respect to the length of the MAC itself. FIG. 7 additionally includes the plots of two possible cases of tipping limits that may result from external conditions, such as ground slope, ambient temperature and headwind, and the tip alarm thresholds corresponding thereto.

With reference to FIG. 7, it may be seen that the paddle-shaped aircraft weight and balance boundary A is approximately centered on a CG position of about 28% of the MAC, and further, that no loading of the exemplary aircraft is permitted for purposes that would result in its CG being disposed at positions less than about 14% of the MAC or greater than about 45% of the MAC. However, during cargo loading and unloading operations, the CG of the aircraft may move outside boundary A, as illustrated by the two meandering "logical" and "worst case" loading and unloading sequences shown in FIG. 7.

The dashed and solid lines B-E shown to the right side of the weight and balance boundary A correspond to the alarm thresholds and associated tipping limits of two cases involving the presence of external conditions during aircraft loading. In particular, the dashed line B corresponds to a NLG stroke sensor signal for the external conditions in which the aircraft is parked on an upslope, adverse shock strut friction, and a hot operating ambient temperature. The dashed line C corresponds to the actual tipping limit for the same external conditions as the dashed line B including the effect of a headwind and cargo movement occurring after a tip alarm, which may be considered a relatively malignant environment. The solid line D corresponds to the NLG stroke sensor 202 signal for the external conditions in which the aircraft 100 is disposed on a down slope, favorable shock strut 120 friction, and a cold operating ambient temperature. The solid line E corresponds to the actual tipping limit for the same external conditions as the solid line D, including the effect of a headwind and cargo movement occurring after a tip alarm which may be considered a relatively benign loading environment.

FIG. 7 thus illustrates the effect of external conditions, such as ground slope, operating temperature, and the presence of headwind, on the alarm threshold (lines B and D) and the corresponding tipping limits (lines C and E). The dashed and solid lines respectively illustrate the two sets of conditions. The relative distances between the threshold lines to the corresponding tipping limit lines represent the margin of safety inherent in the tip alarm system 200. Note the margin of safety represented by the relative distance between line B and line C is greater than is the case for lines D and E. This larger margin of safety occurs for the external conditions which make aircraft tipping more likely (malignant loading environment) and result in a tip alarm system which is more sensitive when the external conditions are more conducive to airplane tipping. In all cases, the tip alarm system 200 of the present disclosure either compensates for or is independent of the presence of such external conditions and thereby provides a reliable mechanism for warning of an incipient aircraft tipping event, regardless of the external conditions present.

Figure 8:
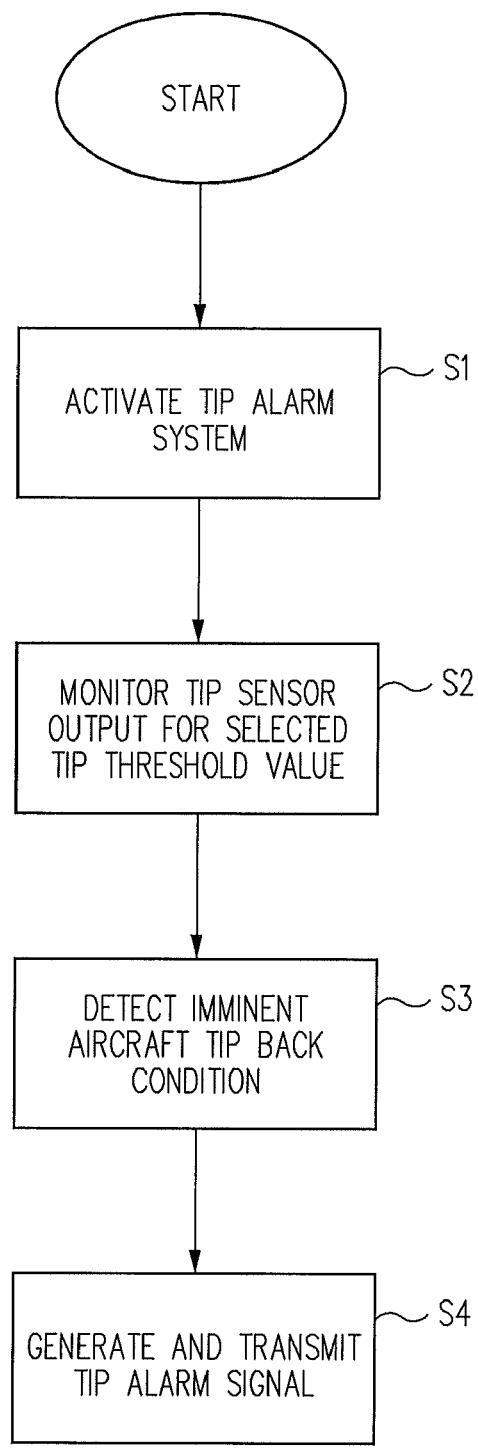

FIG. 8 is a block diagram of an exemplary method 300 of using the exemplary tip alarm system 200 of the present disclosure. As illustrated in FIG. 8, the method begins at S1 with the activation of the system 200, for example, by ground personnel responsible for the loading of an aircraft equipped with the alarm system. At S2, the output of the sensor 202 in the NLG of the aircraft is monitored, e.g., by the controller 208, for the output of a signal corresponding to a selected relative shock strut 120 stroke position corresponding to an imminent aircraft tipping condition. At S3, a shock strut stroke position corresponding to the imminent tipping condition is detected by the system, and at S4, upon the detection of the sensor signal corresponding to the tipping condition, the system 200 generates and transmits an appropriate tip alarm to the loading personnel, and additionally, as described above, may deactivate a cargo handling system 400 engaged in the loading of the aircraft.

As those of skill in this art will appreciate, many modifications, substitutions and variations can be made in the constructions and methods of implementation of the aircraft tip alarm system of the present disclosure without departing from its spirit and scope. In light of this, the scope of the present disclosure should not be limited to that of the particular embodiments illustrated and described herein, as they are only by way of some examples thereof, but instead, should be fully commensurate with that of the claims appended hereafter and their functional equivalents.

What is claimed is:

1. A tip alarm system for an aircraft having a nose landing gear (NLG), the system comprising
   a sensor having first and second parts respectively disposed on portions of the NLG that are respectively fixed to the aircraft and moveable relative to the fixed portion,
   the sensor being operable to detect the position of the first and second sensor parts relative to each other and to generate a tip alarm signal when the first and second sensor parts are disposed at a selected relative position corresponding to an imminent tipping condition of the aircraft.

2. The tip alarm system of claim 1, wherein the first and second sensor parts are disposed on a shock strut of the NLG.

3. The tip alarm system of claim 1, wherein the first and second sensor parts are disposed to move rotationally relative to each other in response to extensional movement of the moveable portion of the NLG relative to the fixed portion thereof.

4. The tip alarm system of claim 2, wherein the first sensor part is mounted on a steering actuator support plate of the shock strut and the second part is mounted on a torsion link thereof.

5. The tip alarm system of claim 2, wherein the first sensor part is mounted on a torsion link pin of the shock strut and the second part is mounted on a torsion link thereof.

6. The tip alarm system of claim 1, wherein the first and second sensor parts are disposed to move linearly relative to each other in response to extensional movement of the moveable portion of the NLG relative to the fixed portion thereof.

7. The tip alarm system of claim 6, wherein the sensor comprises a linear variable displacement transducer (LVDT).

8. The tip alarm system of claim 1, wherein the tip alarm signal is electrical, and further comprising an apparatus operable to produce an alarm sensible by a human being upon receipt of the tipping alarm signal.

9. The tip alarm system of claim 8, wherein the alarm is audibly sensible, visually sensible, or both audibly and visually sensible.

10. The tip alarm system of claim 8, wherein the alarm apparatus comprises a horn, a light, or both a horn and a light.

11. The tip alarm system of claim 8, wherein:
    the aircraft is loaded at least in part by an automatic cargo handling system; and,
    the alarm apparatus is further operable to deactivate the cargo handling system upon receipt of the tipping alarm signal.

12. A method for preventing the tipping back of an aircraft while being loaded or unloaded on the ground, the method comprising:
    equipping the aircraft with the tip alarm system of claim 1;
    activating the tip alarm system during the loading of the aircraft;
    monitoring the position of the first and second sensor parts relative to each other;
    detecting that the first and second sensor parts are disposed at the selected relative position; and,
    generating a tip alarm signal when the first and second sensor parts are disposed at the selected relative position.

13. The method of claim 12, further comprising producing an alarm that is sensible by a human being upon the generating of the tip alarm signal.

14. The method of claim 12, further comprising partially of fully deactivating a cargo handling system engaged in loading the aircraft upon the generating of the tip alarm signal.

15. An aircraft tip alarm system, comprising:
a sensor disposed on a nose landing gear (NLG) of the aircraft and operable to detect the weight imposed by the aircraft on the NLG as a function of the length of the NLG between the aircraft and the ground; and,
apparatus for generating a tip alarm when the weight imposed by the aircraft on the NLG falls below a selected amount.

16. The tip alarm system of claim 15, wherein:
the NLG comprises an elongated shock strut having an upper portion with a upper end pivotably fixed to the aircraft and an opposite lower end, and an elongated lower portion having a lower end in contact with the ground and an opposite upper end moving telescopically within the first portion in response to a reduction in the weight imposed by the aircraft on the NLG; and,
the sensor comprises first and second parts respectively disposed on the first and second portions of the shock strut and is operable to detect the position of the first portion of the shock strut relative to the second portion thereof.

17. The tip alarm system of claim 16, wherein the first and second sensor parts are disposed to move either rotationally or linearly relative to each other in response to the telescopic movement of the lower portion of the shock strut relative to the upper portion thereof.

18. A method for preventing the tipping back of an aircraft while it is being loaded or unloaded on the ground, the method comprising:

respectively disposing first and second parts of a sensor on first and second portions of a nose landing gear (NLG) of the aircraft, the first portion being fixed to the aircraft and the second portion being moveable relative to the fixed portion, the sensor being operable to detect the position of the first and second portions relative to each other;
monitoring the position of the first and second portions of the NLG relative to each other with the sensor during the loading of the aircraft;
detecting that the first and second portions of the NLG are disposed at a selected relative position corresponding to an imminent aircraft tipping condition; and,
generating a tip alarm signal when the first and second portions of the NLG are disposed at the selected relative position.

19. The method of claim 18, further comprising producing an alarm that is sensible by a human being upon the generating of the tip alarm signal.

20. The method of claim 19, wherein the alarm is audibly sensible, visually sensible, or both audibly and visually sensible.

21. The method of claim 18, further comprising using the tip alarm signal to deactivate a cargo handling system engaged in the loading of the aircraft.

* * * * *